United States Patent
Crooijmans et al.

(10) Patent No.: US 8,576,552 B2
(45) Date of Patent: Nov. 5, 2013

(54) DISPLAY ASSEMBLY FOR A COMPUTING DEVICE

(75) Inventors: Wilhelmus Crooijmans, San Jose, CA (US); Yoshimichi Matsuoka, Cupertino, CA (US); Michael J. Francisco, Fremont, CA (US)

(73) Assignee: Palm, Inc., Sunnyvale, CA (US)

( * ) Notice: Subject to any disclaimer, the term of this patent is extended or adjusted under 35 U.S.C. 154(b) by 211 days.

(21) Appl. No.: 13/171,059

(22) Filed: Jun. 28, 2011

(65) Prior Publication Data

US 2012/0026666 A1 Feb. 2, 2012

Related U.S. Application Data

(63) Continuation-in-part of application No. 12/651,301, filed on Dec. 31, 2009, now Pat. No. 8,199,479.

(60) Provisional application No. 61/142,161, filed on Dec. 31, 2008, provisional application No. 61/440,842, filed on Feb. 8, 2011.

(51) Int. Cl.
*G06F 1/16* (2006.01)

(52) U.S. Cl.
USPC .............. 361/679.21; 361/679.3; 361/679.26; 361/679.55; 361/679.56; 379/428.01; 379/433.04; 455/575.1

(58) Field of Classification Search
USPC ........................................ 361/679.21, 679.26
See application file for complete search history.

(56) References Cited

U.S. PATENT DOCUMENTS

| 5,128,662 | A | * | 7/1992 | Failla | 345/1.3 |
| 5,273,475 | A | * | 12/1993 | Oshikawa | 445/24 |
| 5,846,110 | A | * | 12/1998 | Kanagu et al. | 445/25 |
| 6,865,033 | B2 | * | 3/2005 | Laverty | 359/819 |
| 7,747,006 | B2 | * | 6/2010 | Kim et al. | 379/434 |
| 7,839,627 | B2 | | 11/2010 | Tanaka et al. | |
| 8,305,743 | B2 | * | 11/2012 | Wu et al. | 361/679.21 |
| 8,342,325 | B2 | * | 1/2013 | Rayner | 206/320 |
| 2001/0050980 | A1 | * | 12/2001 | Wang | 379/110.01 |
| 2004/0263482 | A1 | * | 12/2004 | Goertz | 345/173 |
| 2005/0130721 | A1 | * | 6/2005 | Gartrell | 455/575.8 |
| 2007/0254730 | A1 | * | 11/2007 | Kim et al. | 455/575.4 |
| 2007/0279853 | A1 | * | 12/2007 | Hung et al. | 361/683 |
| 2008/0311964 | A1 | | 12/2008 | Shibuya et al. | |
| 2009/0163255 | A1 | | 6/2009 | Sadler | |
| 2011/0090626 | A1 | | 4/2011 | Hoellwarth et al. | |

OTHER PUBLICATIONS

Office Action mailed Sep. 30, 2011, for related U.S. Appl. No. 12/651,301, filed Dec. 31, 2009.
Notice of Allowance mailed Feb. 6, 2012, for related U.S. Appl. No. 12/651,301, filed Dec. 31, 2009.

* cited by examiner

*Primary Examiner* — Anthony Q Edwards

(57) ABSTRACT

A display assembly is provided for a computing device. The display assembly includes an exterior shell that includes an outward radius of curvature about two axes (X and Y axis), and is formed from hardened material such as glass.

15 Claims, 4 Drawing Sheets

DISPLAY ASSEMBLY FOR A COMPUTING DEVICE

RELATED APPLICATIONS

This application is a continuation-in-part of U.S. patent application Ser. No. 12/651,301, filed Dec. 31, 2009 now U.S. Pat. No. 8,199,479, which claims priority to U.S. Provisional Patent Application No. 61/142,161, filed Dec. 31, 2008, and also claims the benefit of priority under 35 U.S.C. 119(e) to Provisional Application Ser. No. 61/440,842, filed Feb. 8, 2011, titled DISPLAY ASSEMBLY FOR A COMPUTING DEVICE; all of the aforementioned patent applications being hereby incorporated by reference in their respective entirety.

TECHNICAL FIELD

The disclosed embodiments relate generally to the field of display assemblies for mobile computing devices.

BACKGROUND

Over the last several years, the growth of cell phones and messaging devices has increased the need for keypads and button/key sets that are small and tightly spaced. In particular, small form-factor keyboards, including QWERTY layouts, have become smaller and more tightly spaced. With decreasing overall size, there has been greater focus on efforts to provide functionality and input mechanisms more effectively on the housings.

In addition to a keyboard, mobile computing devices and other electronic devices typically incorporate numerous buttons to perform specific functions. These buttons may be dedicated to launching applications, short cuts, or special tasks such as answering or dropping phone calls. The configuration, orientation and positioning of such buttons is often a matter of concern, particularly when devices are smaller.

At the same time, there has been added focus on how displays are presented, particularly with the increased resolution and power made available under improved technology. Moreover, form factor considerations such as slimness and appearance are important in marketing a device.

Production of mobile computing devices is made more difficult by the fact that conventional devices use many parts or components. The housing for a conventional mobile computing device typically includes a top shell, a back shell, and a midframe. The components that comprise the contents of the housing, such as printed circuit boards and display assemblies, normally require additional assembly steps. Many devices include additional housing features that are provided on the device separately. The result is that the devices often have numerous interconnected components. In the case of the housing, the numerous components yield devices that are less durable and more difficult to assemble.

DETAILED DESCRIPTION

Embodiments described herein provide for a display assembly that includes an outwardly rounded exterior surface. According to some embodiments, a display assembly is provided for a computing device that includes an outward radius of curvature about two axes (X and Y axis). Furthermore, the display assembly may include an exterior shell formed from hardened material such as glass.

In some embodiments, a display assembly includes an exterior shell that is rounded, so as to include an outward radius of curvature about the X and/or Y axes. The interior surface of the exterior shell is flat, or substantially flat (e.g. a majority of the underside of the shell is flat). Such a configuration enables a device to provide a rounded display surface, while facilitating manufacturing of the display assembly using the portions of the underside that are flat.

In an embodiment, a display assembly is provided for a computing device. The display assembly includes an exterior shell that (i) is translucent or clear, (ii) has at least a rounded exterior surface, and (iii) has a substantially flat underside along at least a mid-section of the exterior shell.

In some embodiments, the exterior shell of the display assembly forms a portion of a face of a computing device that extends beyond the display surface boundaries. For example, in some embodiments, the exterior shell may form the entire front face of a computing device, including non-display surface areas, sensor areas and perimeter areas that are not part of the display surface. Still further, the exterior shell of the display assembly may form a front housing segment of the device as a whole, including sidewalls or perimeter structures that mate with a midframe and/or back housing segment.

According to one or more embodiments, a display assembly includes liquid adhesive or glue layers to affix an underside of an exterior shell of the display assembly to its internal layers (e.g. illumination or LCD component). Still further, one or more embodiments provide that an underside of the curved exterior shell of the display assembly is flat when the display assembly is manufactured. The underside may also be flattened with application of the liquid adhesive, using clamps or mechanical force, thus enabling the liquid adhesive to settle and support the exterior shell.

U.S. patent application Ser. No. 11/971,136, entitled MOBILE COMPUTING DEVICE WITH MOVEABLE HOUSING SEGMENTS, is hereby incorporated by reference in its entirety for all purposes. The aforementioned application recites housing and display assembly configurations of which at least some are applicable with the embodiments described herein.

Figure 1:
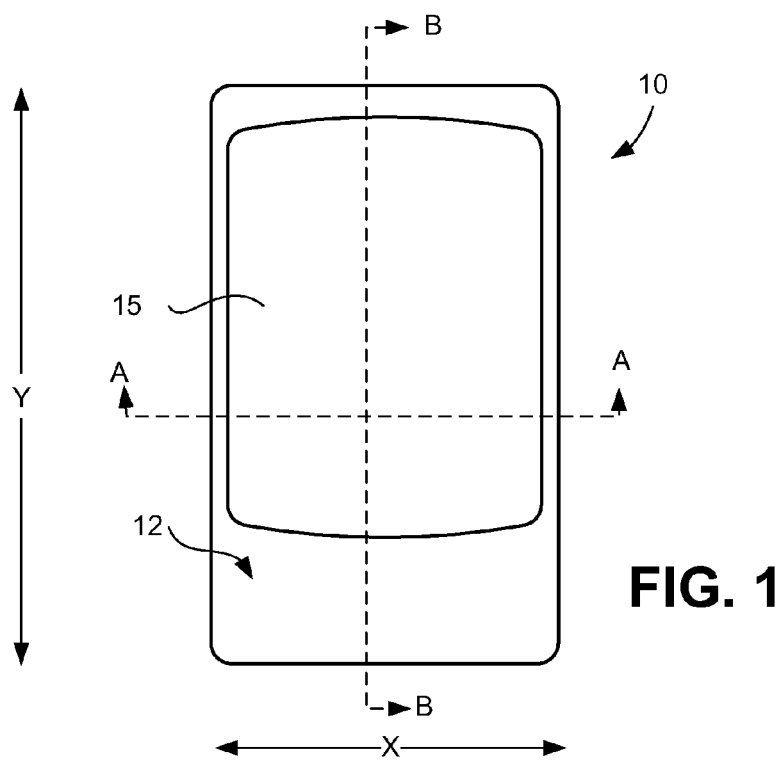
FIG. 1 illustrates a mobile computing device on which a display assembly is provided in accordance with one or more embodiments.

FIG. 1 illustrates a mobile computing device on which a display assembly is provided in accordance with one or more embodiments. The computing device 10 includes a front façade 12 that includes a display surface 15. The display surface 15 may correspond to an exterior surface of the display assembly, as described with an embodiment of FIG. 2A. According to embodiments, the display surface 15 is rounded or curved about one or two axes.

In some embodiments, the display assembly 100 is part of a mobile computing device. Such a mobile computing device can be equipped with cellular telephony and data resources, so as to enable cellular telephony and messaging. According to various embodiments, the device may correspond to a cellular telephony/data devices, capable of enabling voice/telephony communications, messaging services (e.g. email, Short Message Service (SMS), Multimedia Message Service (MMS), Instant Messaging) and/or other functionality such as media playback, Global Positioning System (GPS) functionality, wireless fidelity (WiFi) or Internet access, and image/video capture. As such, the device 10 may be relatively small, such as in the form of a handheld device.

Embodiments described herein may alternatively be implemented on computing devices with other form-factors. For example, embodiments described herein may be incorporated into tablet or slate devices, or other display dominant devices.

Display assemblies on computing devices typically include multiple layers or stacks, depending on the configuration and functionality incorporated into such assemblies. An outermost shell is typically translucent or clear, and it overlays an LCD element. Capacitive or resistive sensor layers may be disposed in the stack, such as between the outer layer and the LCD. In conventional display assemblies, an outer panel is usually provided over a sensor layer (e.g. formed from indium in oxide (ITO) or Capacitive plate) in a manner that extends touch or contact-sensitive functionality to the exterior surface of the outer layer. An air gap can sometimes be formed by design between the outer layer and the LCD or its overlaying sensor layer. Such air gaps dull the output of the device.

Figure 2A:
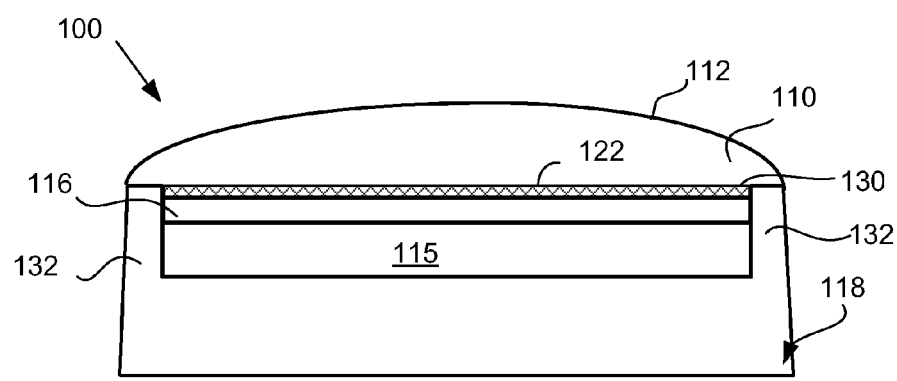
FIG. 2A is a side cross-sectional view of the display assembly, as depicted by an embodiment of FIG. 1, as cut along lines A-A, under an embodiment.
Figure 2B:
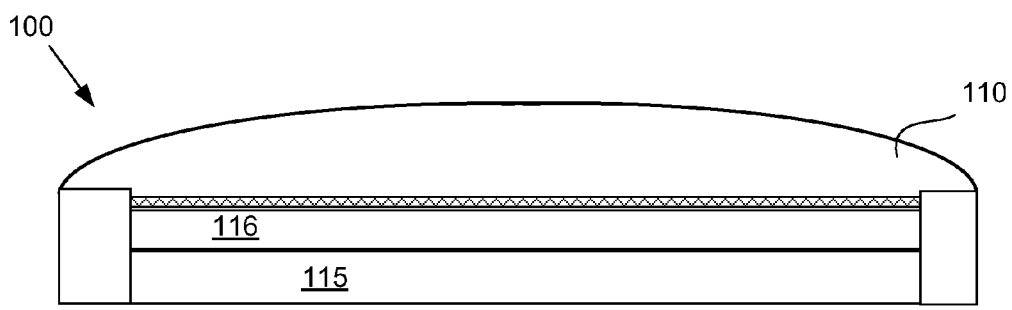
FIG. 2B is a side cross-sectional view of the display assembly, as depicted by an embodiment of FIG. 1, as cut along lines B-B, under an embodiment.

FIG. 2A illustrates a cross-sectional view of the display assembly for a mobile computing device as depicted by an embodiment of FIG. 1 along lines A-A, according to an embodiment. In an embodiment, the exterior shell 110 of the display assembly 100 is shaped or formed from hardened translucent material. In particular, embodiments provide that the exterior shell is formed from glass, such as GORILLA GLASS, manufactured by CORNING, INC. An exterior side 112 is curved along the X axis (and Y axis is cured as depicted in FIG. 2B). Prior to assembly, the exterior shell 110 is shaped to accommodate and receive other layers of the display assembly. The other layers include (i) an illumination component, depicted as LCD (liquid crystal display) 115, (ii) and a touch sensor layer 116 (which can be formed from capacitive sensors and integrated circuits). Other sensors or sensor layers may alternatively be implemented, such as optical sensors for enabling an optical sensitive touch display. As an alternative or variation, the illumination component 115 may include a backplane that provides light emitting diodes (LEDs) or organic light emitting diodes (OLEDs). The touch sensor layer may be formed from a glass capacitive thickness or indium in oxide (ITO) layer, polyethylene terephthalate (PET) film or combination thereof. The layers of the display assembly may be encapsulated by a bottom section 118.

With a configuration such as described with FIG. 2A, embodiments provide that an underside 122 of the exterior shell 110 is affixed to the underlying layer (depicted in FIG. 2A as being the sensor layer). Such an implementation significantly reduces or removes the air gap that can accompany some conventional designs, enabling better output from the exterior shell. An adhesive layer 130 is deposited to affix the exterior shell 110 to the underlying layer.

In an embodiment, the exterior shell 110 is rounded. In particular, the exterior shell is concave. It should be noted that the contour of the display assembly as shown in FIG. 2A and FIG. 2B is exaggerated. In implementations, the the contour depicted in FIG. 2A and FIG. 2B is detectable to plain sight, provided that point of perspective is up close to the device.

According to one embodiment, the exterior shell 110 is formed from a first material, and the sidewalls 132 adjoining the exterior shell 110 along the sides and/or perimeter of the device are formed from a second material. In one implementation, the exterior shell 110 is formed from glass, while the side walls 132 are formed from plastic. The glass material of the exterior shell 110 can be connected to the sidewalls 132 at seams, using connective material (e.g., adhesives) or structures (use of chamfers formed into the edge of the glass and plastic).

According to embodiments, the sidewalls 132 are dimensioned to extend vertically (into the thickness of the display assembly) to encompass the layers of the display assembly, including the illumination component 115 (e.g., LCD). Among other benefits, by extending the sidewalls 132, exterior surface of the sidewalls 132 maintain a continuously curved outer surface on the mobile computing device that extends around or provides the perimeter sides of the computing device.

FIG. 2B is a side cross-sectional view of the display assembly 100, as depicted by an embodiment of FIG. 1, as cut along lines B-B, under an embodiment. In FIG. 2B, the exterior shell 110 is contoured outward or concave, so as to be curved about the Y axis. The exterior shell 110 extends over the stack comprising the adhesive layer 130, the sensor layer 116 and the LCD 115.

With reference to FIG. 2A and FIG. 2B, more embodiments provide for use of glue, applied in liquid form, to the underside 122 and or its underlying layer. The glue can then be cured (e.g., with ultraviolet light) to affix the exterior shell 110 to the underlying layers.

Embodiments recognize a potential for the glue deposition process to cause the glue to cluster or form non-uniformly on the underside 122 of the exterior shell 110. Such non-uniformity can cause the LCD output to have hot spots (or other visual variations) that affect the quality of the display. Such non-uniformity can be enhanced because the underside 122 of the exterior shell 110 is not necessarily flat. For example, manufacturing can lead to slight curvature in the formation of the underside. Such natural curvature can disturb the uniform dispersion of glue on its underside. In order to promote uniform dispersion of glue in liquid form on the underside 122, an embodiment provides that the exterior shell 110 is clamped back to flatten underside 122, at least until the glue is deposited and the shell is combined with the flat LCD 115. In one implementation, the clamping may occur at corners that coincide with the formation of the sidewalls 132. The flattening of the exterior shell 110 in the manufacturing process enables the glue to be deposited and cured in substantially uniform manner.

Given desired design parameters of the curved or rounded exterior shell 110 and the sidewalls 132, the manner in which the adhesive layer 130 is formed can affect the quality of the output from the display assembly. Other manufacturing techniques may also be employed, such as the use of adhesive tape. The use of tape, for example, is difficult from a manufacturing perspective, due to the presence of sidewalls 122 and the natural tendency of the tape to bubble up.

Figure 3:
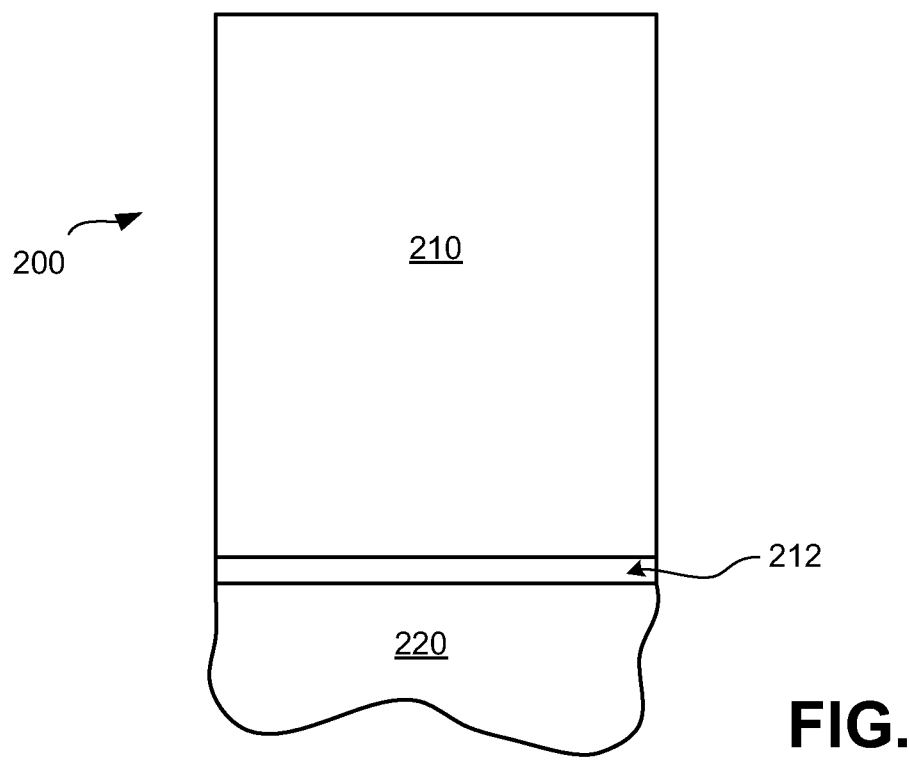
FIG. 3 is a side view of a section of a display assembly depicting an optional design for a sensor layer, under an embodiment.

FIG. 3 is a side view of a section of a display assembly depicting an optional design for a sensor layer, under an embodiment. In FIG. 3, sensor layer 200 is capacitive to detect presence of human skin. It may be placed underneath the exterior shell 110 (FIG. 2) in order to detect touch by a user or operator of a mobile computing device 10 (FIG. 1). In an embodiment, sensor layer 200 has a hybrid composition: it includes a translucent and rigid sensor region (e.g. glass portion 210), and a flexible sensor region (e.g. polyethylene terephthalate (PET) Film section 220). In one embodiment, conductive film 212 may be applied over or between the two portions. The glass portion 210 may be rectangular, while the PET film portion 220 may be irregular in shape in at least one dimension. Among other benefits, the PET film portion 220 is bendable. Thus, with reference to, for example, a display assembly that has the curvature depicted in FIG. 2, the PET film portion 220 can be used to bend inward to match the curvature of the display screen. By matching the curvature of the display screen, the sensor layer can be extended in dimension, even in presence of rounded exterior shells.

Housing/Device Example

Figure 4:
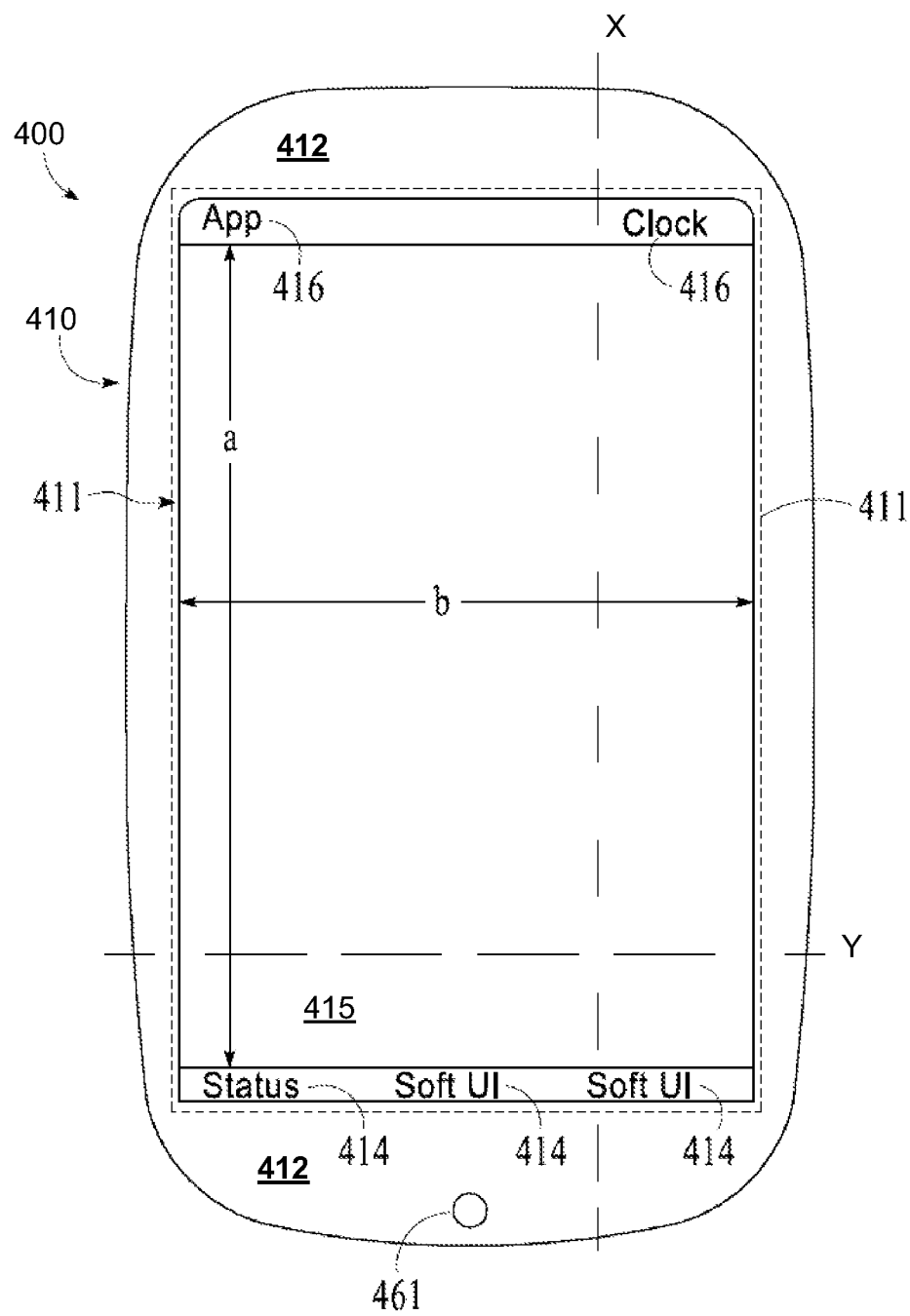
FIG. 4 illustrate the front housing segment for computing device 100, according to one or more embodiments.

FIG. 4 illustrate the front housing segment for a computing device, in accordance with some embodiments described herein. An embodiment provides that computing device 400 includes a front housing segment 410 that is display-dominant. As display-dominant, most of the interface features and surface area is dedicated for use as a display surface or display interface (e.g. computer-generated soft buttons). Moreover, one or more embodiments provide that the front housing segment 410 includes various features that accentuate the segments appeal and functionality for display surface viewing and soft-user interface feature operability.

With reference to FIG. 4, the housing 410 contains internal components of the computing device. Internal components include, for example, processor(s), memory resources, circuit boards and other features. According to some embodiments, housing 410 may be comprised of a shell that forms an exterior segment of the display assembly. As previously described, the exterior shell of the display assembly may provide a display surface, that is provided as a smooth (or flush), visually integrated portion of the housing. A front face 412 of the housing 410 may include a display surface 415 as a portion. In some embodiments, the display surface 415 is combined with capacitive or resistive sensors that detect skin contact, touch, movement or object contact. The sensor-sensitive regions of the face 412 may overall and extend beyond the integrated display surface 415. In an implementation shown, the display surface 415 and front façade 412 are part of an exterior shell that overlays a display assembly (e.g. LCD). Such an exterior shell (including the display surface 415) is outwardly rounded or convex about one (X or Y) or two axes (X and Y).

The front housing segment 410 of device 400 is shown to be dominant in display surface and optionally, soft user-interface features, such as touch areas and/or display surfaces. As the front housing segment 410 is dominant for such soft features, a substantial amount of the total area of the front face 412 is either a display surface 415 or a region on which various soft features 414, 416 and input areas are provided. The display surface 415 includes any surface that has computer-generated light patterns, as well as surfaces illuminated from light sources that are not computer-generated. For example, light sources (e.g. such as discrete light sources) may be used to illuminate specific regions of a translucent thickness in combination with touch-sensors, so as to create soft-buttons on the surface of the front housing segment 410.

In an embodiment, the area of the display surface 415 may be represented by dimensions a and b, which occupies a portion of the overall planarized area (i.e. without surface curvature) of the front surface of the housing segment 410, as represented by dimensions a and b. In an embodiment, the front face 412 is display-dominant so as to include soft user-interface features, with a substantial amount of the area being dedicated to providing a display surface 415 or its soft features. In one embodiment, a substantial majority of the area on the front face 412 (i.e. an area in excess of 60% of the total area of the front face 412) is dedicated to providing the display surface 415 and/or soft features (which may or may not be computer-generated).

Still further, one implementation provides for inclusion of isolated and small-profile mechanical features, including buttons or multi-way mechanisms. Features such as capacitive surfaces, light-sensitive surfaces, resistive sensors and touchpads may all be included on the front face 412. However, under one embodiment, the features may be incorporated or integrated into the display surface, and/or occupy a perimeter boundary in which the display surface 415 occupies the substantial majority of the front housing segment.

Still further, one implementation provides that the user-interface features 414 and/or 416 are provided as display surfaces that are separated or otherwise apart from the main display surface 415.

For example, the user-interface features 414 may be provided as translucent thicknesses, with or without printed graphics, that overlay individual Light Emitting Diodes (LEDs) or other discrete light sources. The user-interface features 414 may be combined with capacitive sensors or light sensors to detect user-touch touch or interaction.

According to an embodiment, the display surface 415, including the soft features 414, 416, is flush with its surrounding area. As an addition or alternative, an embodiment provides that an extended area 411 (shown by phantom lines 411) that includes display surface 415 and soft features 414, 416 is seamless and contoured. The result is a substantially smooth and display-dominant front housing segment 410.

In an embodiment, the device 400 includes a mechanical interface 461 on the front exterior face 412. The mechanical interface 461 may correspond to a button or other push-mechanism. Selection actions or other functions may be performed in connection with, for example, soft features 414, 416 and/or independently.

Hardware Diagram

Figure 5:
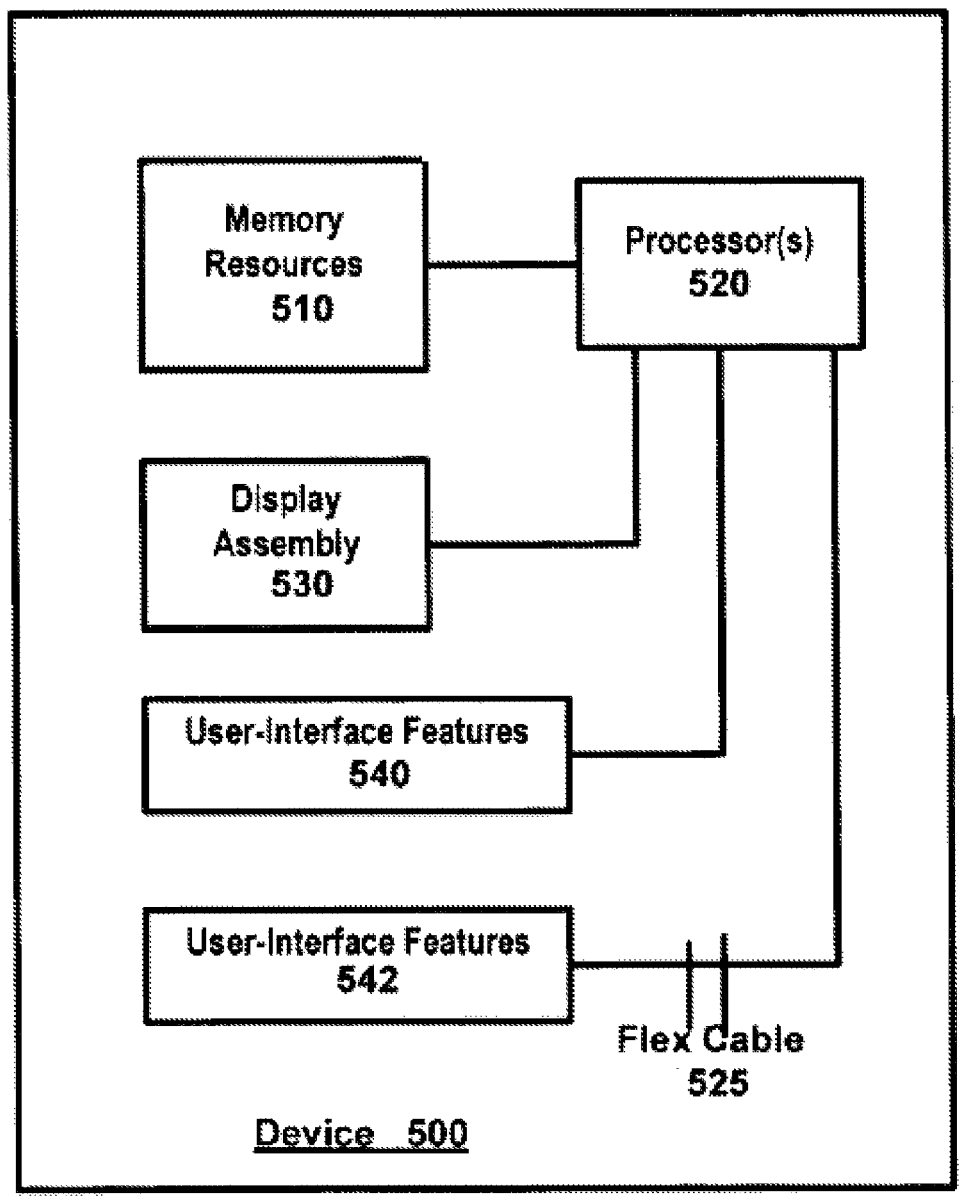
FIG. 5 is a hardware diagram of a device for use with any of the embodiments described herein.

FIG. 5 is a hardware diagram of a device for use with any of the embodiments described herein. A device 500 may correspond to any of the devices illustrated with preceding embodiments. The device 500 may include memory resources 510, one or more processors 520, a display assembly 530, and various user-interface features 540, 542. In one embodiment, at least some of the user-interface features 540, 542 (e.g. keyboard or keypad) may be separated so as to be in a different housing segment from the one or more processors 520. A flex cable 525 may be used to interconnect the separated input/output interfaces 542 from the processors 520 and/or other components. However, in other embodiments, any of the internal components and devices, including one of multiple processors, may be distributed between the two housing segments.

Exterior portions of the display assembly 530 can form part of the device housing. The one or more processors are capable of generating or detecting input from soft-interface features that are provided with the display assembly 530. The soft-user interface features may be provided as computer-generated features in connection with operation of the display assembly 530, or alternatively, as fixed features. As mentioned with prior embodiments and/or soft-user interface features may operate with touch, contact or light sensors (e.g. capacitive sensors).

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

What is claimed is:

1. A display assembly for a computing device comprising:
an exterior shell that includes an exterior surface (i) comprised of hardened material, and (ii) having a convex curvature along at least both of an X and Y axes; and
a sensor layer that is contoured and provided under the exterior shell.

2. The display assembly of claim 1, wherein the hardened material corresponds to glass.

3. The display assembly of claim 1, wherein exterior surface includes a first radius of curvature along an axis of length and a second radius of curvature along an axis of width.

4. The display assembly of claim 1, further comprising one or more segments comprising at least a portion of a perimeter for the display assembly, wherein the one or more segments are formed from plastic.

5. The display assembly of claim 4, wherein the one or more segments extend to encompass at least a portion of a thickness of the computing device.

6. The display assembly of claim 1, wherein the display assembly includes an illumination component that is provided under the sensor layer.

7. The display assembly of claim 1, wherein the exterior shell is adhered to the sensor layer by an adhesive.

8. The display assembly of claim 7, wherein the adhesive is cured after its deposition.

9. A computing device comprising:
a display assembly comprising:
an illumination component,
an exterior shell that overlays the illumination component to provide a display surface, wherein the display surface (i) is translucent or clear, (ii) includes an outwardly rounded exterior surface that is rounded about each of an X and Y axes, and (iii) is formed from glass, and
a sensor layer that is contoured and provided under the exterior shell and above the illumination component.

10. The computing device of claim 9, further comprising a housing including side walls, wherein at least portions the illumination component and the sensor layer are provided within the side wall.

11. The computing device of claim 9, wherein the illumination component includes one or more of a liquid crystal display (LCD), a light emitting diode (LED), and/or an organic light emitting diode (OLED).

12. The computing device of claim 9, wherein the exterior shell is adhered to sensor layer.

13. The computing device of claim 12, wherein the exterior shell is adhered to the sensor layer by an adhesive that is cured after its deposition.

14. The computing device of claim 9, wherein the computing device is a mobile computing device.

15. The computing device of claim 9, wherein the computing device is a tablet.

* * * * *

UNITED STATES PATENT AND TRADEMARK OFFICE
CERTIFICATE OF CORRECTION

| | | |
|---|---|---|
| PATENT NO. | : 8,576,552 B2 | Page 1 of 1 |
| APPLICATION NO. | : 13/171059 | |
| DATED | : November 5, 2013 | |
| INVENTOR(S) | : Wilhelmus Crooijmans et al. | |

It is certified that error appears in the above-identified patent and that said Letters Patent is hereby corrected as shown below:

In the Specification

In column 3, line 26, delete the words "indium in" and insert -- indium --, therefore.

In column 3, line 53, delete the words "indium in" and insert -- indium --, therefore.

In column 3, line 67, delete the words "the the" and insert -- the --, therefore.

In column 4, line 32, delete "and or" and insert -- and/or --, therefore.

In column 6, line 24, delete the word "user-touch" and insert -- user --, therefore.

In the Claims

In column 8, line 17, in Claim 10, delete "portions" and insert -- portions of --, therefore.

In column 8, line 19, in Claim 10, delete "side wall" and insert -- side walls. --, therefore.

In column 8, line 25, in Claim 12, delete "to" and insert -- to the --, therefore.

Signed and Sealed this
Ninth Day of December, 2014

Michelle K. Lee
*Deputy Director of the United States Patent and Trademark Office*